2 Sheets—Sheet 1.

J. L. CLARK & J. STANDFIELD.
Floating-Dock.

No. 210,185. Patented Nov. 26, 1878.

WITNESSES
Wm A Skinkle
Geo W Breck

By their Attorneys
Baldwin, Hopkins & Payton

INVENTORS
Josiah L Clark
John Standfield

2 Sheets—Sheet 2.
J. L. CLARK & J. STANDFIELD.
Floating-Dock.
No. 210,185. Patented Nov. 26, 1878.
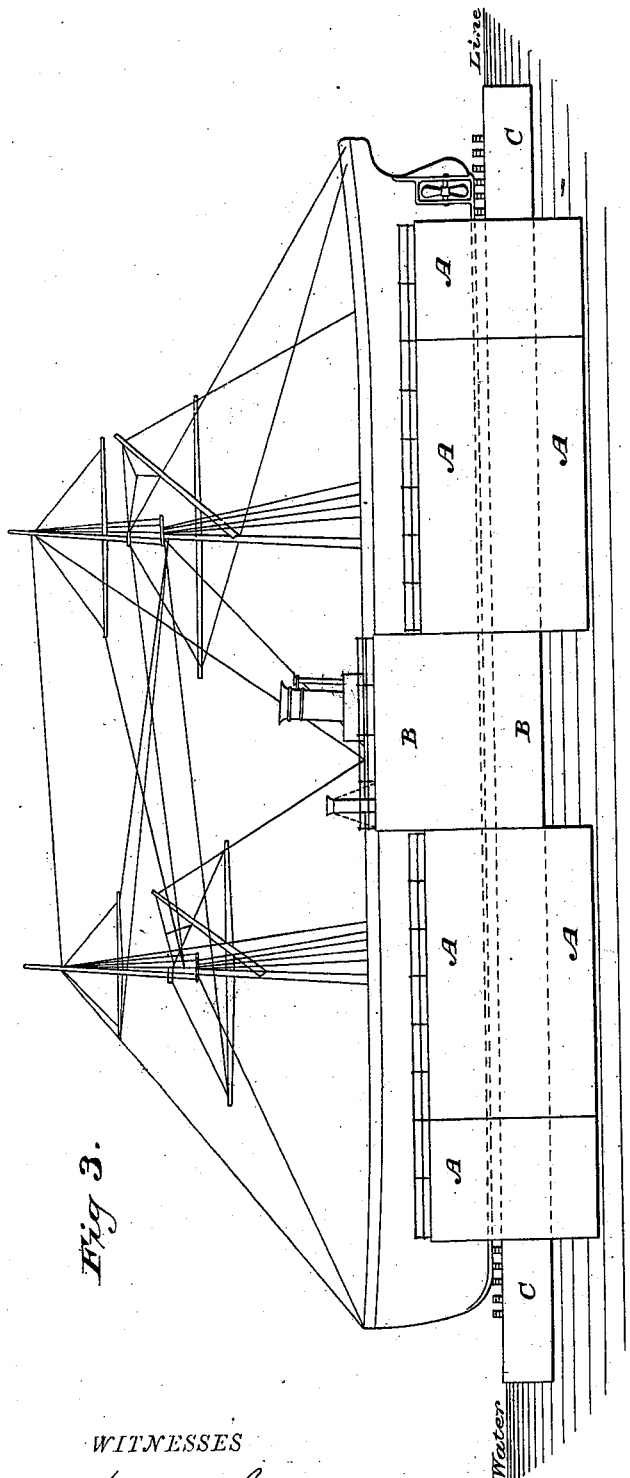
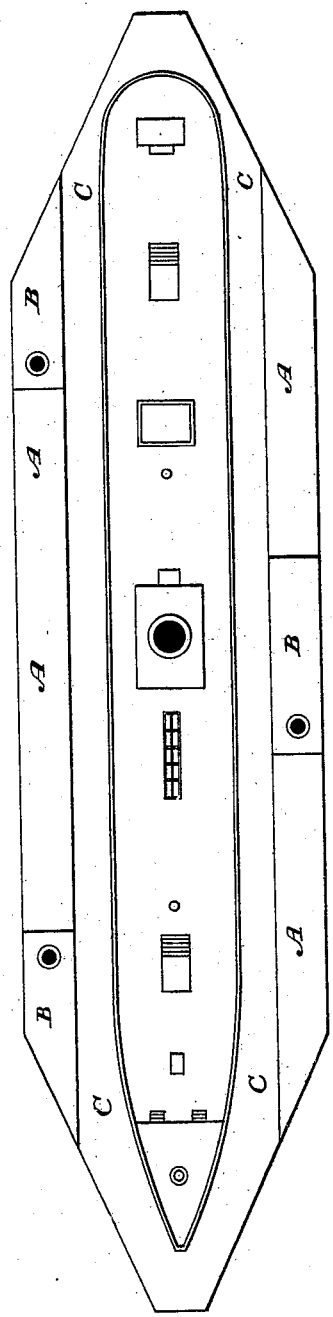
WITNESSES
INVENTORS
Josiah L. Clark,
John Standfield
By their Attorneys

UNITED STATES PATENT OFFICE.

JOSIAH L. CLARK AND JOHN STANDFIELD, OF WESTMINSTER, ENGLAND.

IMPROVEMENT IN FLOATING-DOCKS.

Specification forming part of Letters Patent No. 210,185, dated November 26, 1878; application filed June 25, 1878; patented in England, February 9, 1878.

*To all whom it may concern:*

Be it known that we, JOSIAH LATIMER CLARK and JOHN STANDFIELD, both of 6 Westminster Chambers, Victoria street, in the city of Westminster, England, have invented new and useful Improvements in Floating-Docks, which improvements are fully set forth in the following specification, reference being had to the accompanying drawings.

These improvements consist, principally, in so constructing a dock that the sides or portions of the sides of the dock are attached to the body of the dock by vertical grooves or slides, or by hinges, so that these portions can be raised or lowered independently.

Figure 1:

The vessel is first raised by the dock in its normal or U-shaped form, Figure 1, as high as the lifting power of the dock will admit. The sides or portions of the sides are then allowed to descend by means of the slides or hinges until they are nearly submerged, so that the end elevation of the dock resembles the letter H, Fig. 2, and, being keyed or secured in their new position, the water is then pumped out of them, and their lifting power raises the vessel to its full height.

It will be seen that by this arrangement, when a vessel is docked, instead of the sides of the dock being uselessly raised high out of the water, and having to be supported by the body of the dock, the greater portion of their lifting power is brought into action, and the effective power of the dock is by this means at least doubled.

It is preferable that certain portions of the sides should be permanently fixed to the body of the dock and contain the engines and pumps. Supposing, for example, the four corners of the dock to be fixed at B B, Fig. 5, then there will be two intermediate portions, A A, sliding in grooves, one on each side. The dock, when fully lowered, would have the ordinary U form of section. On pumping the water out of the dock the bottom or body of the dock, with its four corner elevations, would rise, the stability of the whole system being insured by the displacement of the four corners of the dock and of the vessel itself. The two sides being detached would remain down at their lowest level, as at A A, Fig. 5. When all the lifting power of the bottom of the dock has been developed, the two sliding side portions are keyed or otherwise secured and pumped dry, and their buoyancy is thereby added to that of the dock.

In some cases we prefer that the two central portions of the sides of the dock should be fixed and contain the engines and pumps, as in Fig. 3. In this case there will be four independent sliding portions, one at each corner, which may be utilized in the manner before described. They may either be lowered one at a time or in pairs transversely, so as not to affect the equilibrium of the dock.

Figure 2:
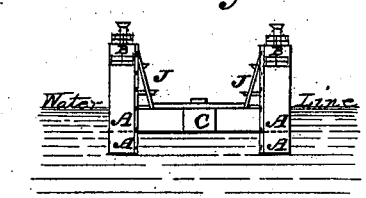

In order to form guides for the sliding portions, we use the fixed portions, and, in addition to these, we erect along each side a number of shoring-frames, J J, Figs. 1 and 2, which carry slides at their back, and are utilized in front, so as to form shoring-frames for the vessel within the dock.

Figure 7:
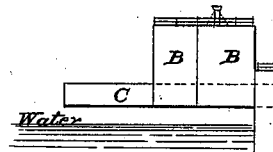
Figure 9:
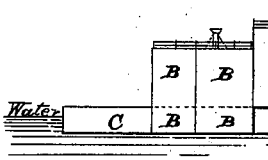

It will be seen that, if the body of the dock be pumped dry, when the sliding portions are keyed at their highest level they will be raised and supported entirely out of the water, as in Fig. 9, and thus conveniently situated for cleaning and painting, and, on the other hand, if the sliding portions be keyed at their lowest level, and are properly proportioned, they will, when pumped dry, as in Fig. 7, entirely raise and support the body of the dock above the water, and thus enable every part of the dock to become readily accessible for cleaning, painting, or repairs. The whole dock is thus perfectly self-docking.

In some cases it is advantageous to allow the sides to be lowered on hinges instead of by means of slides, as will be hereinafter described. This form of dock can very well be used for raising sunken vessels by taking alternate lifts, first on the body of the dock, and then on the sides.

In the drawings, Fig. 1 shows an end elevation of the dock in its normal form, lowered down ready to receive a vessel. Fig. 2 shows the same in its second position. In this case the dock with a vessel on it is raised to its full height, and a side elevation of the same is shown in Fig. 3. The dock is supposed to have been raised as high as possible while in the form shown in Fig. 1, and the four corner sliding portions (marked A A, Figs. 1, 2, and 3) have been then lowered, and the water pumped out of them sufficiently to raise the vessel.

Fig. 4 shows a plan of the dock, with the sliding portions A A on one side shown at the corners and on the other shown as being in the middle of the dock.

In all these drawings the fixed portions of the sides which are permanently attached to the dock are marked B B. The body of the dock is in each case marked C C.

Figure 5:
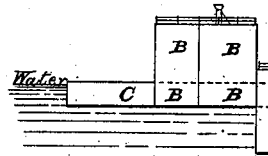
Figure 6:
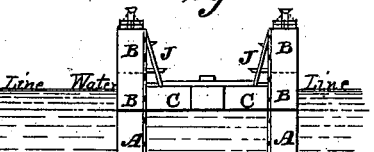

Fig. 5 shows a side elevation of a dock, in which the fixed portions B B, containing the engines, are at the four corners of the dock, and the sliding portions A A are at the two sides. In this case the sides are shown at their lowest elevation, so as to give the greatest possible power to the dock. Fig. 6 shows an end elevation of the same.

Figure 8:
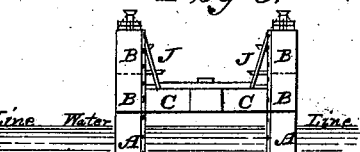

Fig. 7 shows an elevation of the dock with its sides lowered and pumped dry. The body of the dock C C and the fixed corners B B are thereby elevated completely above the water for the purpose of cleaning and painting. Fig. 8 shows an end elevation of the same.

Figure 10:
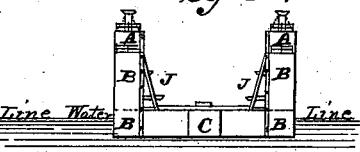

Fig. 9 is a side elevation of the dock with the sliding sides A A elevated above the water by means of the buoyancy of the dock, so as to be accessible for cleaning and painting, and Fig. 10 is an end elevation of the same. By these two operations each portion of the dock becomes successively accessible at all points for repairs or painting.

Figure 12:
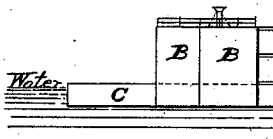
Figure 11:
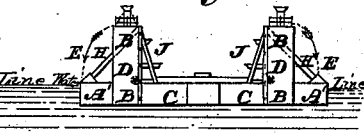
Figure 13:
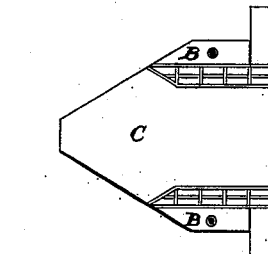

When the water is very shallow, we sometimes prefer to let the sides turn down on hinges instead of sliding down in grooves. By this construction the dock is able to float in very shallow water, and it may be used for lifting vessels over bars or into rivers or creeks where there is not much depth of water. Fig. 11 shows an end elevation of the dock in this form, the sides of the dock turned down upon the hinges or centers D D, in the direction indicated by the dotted arrows E E, until they rest in the new position A' A', or in some intermediate position. The whole buoyancy of the sides is thus brought into play. Fig. 12 shows the same in side elevation, and Fig. 13 in plan, the same letters being used in each case.

Figure 14:
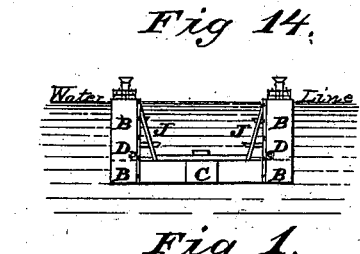
Figure 15:
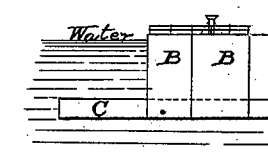
Figure 16:
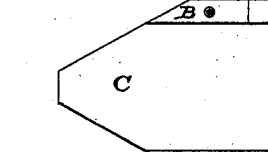

Figs. 14, 15, and 16 show the dock lowered ready to receive a vessel, with the sides in the ordinary position and partly filled with water. On pumping out the water from the body of the dock C C it rises, and the sides A A gradually fall outward, turning upon their hinges. When the whole of the water has been pumped out of the body of the dock, the sides A A are allowed to fill with water and to sink into the position shown in Fig. 11. When in this position they are secured by the struts H H, or by other means, and the water is then pumped out of them, and the full elevation of the dock is obtained.

The struts H H may be provided with pawls locking into ratchets on the side shoring-frames J J J, or vice versa, so that as the sides descend they are continually held in their new position.

Having thus described our invention, we would have it understood that we do not confine ourselves to the exact forms of floating-docks shown in the drawings annexed, but that we claim—

1. The floating-dock constructed of adjustably-connected portions or sections, adapted to be raised or lowered independently or together, the same consisting, essentially, of the buoyant sides or portions of the sides and the body of the dock, to which they are attached by vertical grooves or slides, whereby either said attached portions or the body of the dock may be raised and supported entirely above the water.

2. The combination, substantially as hereinbefore set forth, of the body of the dock and the sliding or adjustable portions, whereby, after having exhausted the lifting power of the dock in its ordinary or U form, the said adjustable portions may be lowered and pumped dry and the lifting power of the dock greatly increased.

3. The combination of the body C, the permanently-fixed corners or buoyant portions B of the sides, and the sliding or hinged buoyant portions A, substantially as and for the purpose set forth.

J. LATIMER CLARK.
JOHN STANDFIELD.

Witnesses:
CHAS. BERKLEY HARRIS,
JNO. DEAN,
*Both of* 17 *Gracechurch Street, London.*